US009519338B2

(12) United States Patent
Du

(10) Patent No.: US 9,519,338 B2
(45) Date of Patent: Dec. 13, 2016

(54) TASK PROCESSING APPARATUS AND METHOD INCLUDING SCHEDULING CURRENT AND NEXT-LEVEL TASK PROCESSING APPARATUS

(71) Applicant: HUAWEI TECHNOLOGIES CO., LTD., Shenzhen, Guangdong (CN)

(72) Inventor: Xuefeng Du, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 403 days.

(21) Appl. No.: 14/096,398

(22) Filed: Dec. 4, 2013

(65) Prior Publication Data

US 2014/0173609 A1 Jun. 19, 2014

(30) Foreign Application Priority Data

Dec. 6, 2012 (CN) .......................... 2012 1 0520190

(51) Int. Cl.
| | |
|---|---|
| G06F 9/46 | (2006.01) |
| G06F 15/76 | (2006.01) |
| G06F 7/38 | (2006.01) |
| G06F 1/32 | (2006.01) |
| G06F 9/48 | (2006.01) |

(52) U.S. Cl.
CPC ............. *G06F 1/3296* (2013.01); *G06F 1/329* (2013.01); *G06F 9/4881* (2013.01); *G06F 9/4893* (2013.01); *Y02B 60/1285* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 8,275,976 B2* | 9/2012 | Glew ................... | G06F 9/3012 712/220 |
| 2002/0008256 A1* | 1/2002 | Liu ....................... | G06F 9/3867 257/207 |
| 2002/0073129 A1 | 6/2002 | Wang et al. | |
| 2010/0205607 A1 | 8/2010 | Shivanna et al. | |
| 2012/0047514 A1 | 2/2012 | Seo et al. | |

FOREIGN PATENT DOCUMENTS

CN        102763086        10/2012

OTHER PUBLICATIONS

Chinese Office Action dated Feb. 3, 2015 in corresponding Chinese Patent Application No. 201210520190.0.

* cited by examiner

*Primary Examiner* — Bing Zhao
(74) *Attorney, Agent, or Firm* — Staas & Halsey LLP

(57) ABSTRACT

The present invention discloses a task processing apparatus and a method, and belongs to the field of radio communications technologies. The method includes: obtaining, by a task processing apparatus, one or more configured tasks, and selecting a task to be scheduled from the one or more tasks; and processing the task to be scheduled according to control parameters of the task to be scheduled to obtain a processing result, outputting the processing result of the task to be scheduled, and, according to the control parameters of the task to be scheduled, scheduling a next-level task processing apparatus to process the task to be scheduled. In the present invention, the task processing apparatus selects the task to be scheduled from the one or more configured tasks, and then processes the task to be scheduled in real time according to the control parameters of the task to be scheduled.

10 Claims, 6 Drawing Sheets

TASK PROCESSING APPARATUS AND METHOD INCLUDING SCHEDULING CURRENT AND NEXT-LEVEL TASK PROCESSING APPARATUS

CROSS-REFERENCE TO RELATED APPLICATIONS

This application claims priority to Chinese Patent Application No. 201210520190.0, filed on Dec. 6, 2012, which is hereby incorporated by reference in its entirety.

TECHNICAL FIELD

The present invention relates to the field of electronic technologies, and in particular, to a task processing apparatus and a method.

BACKGROUND

With rapid development of a multi-core technology, an SOC (System On Chip, system on chip) becomes more and more sophisticated, and processing units in the SOC are increasing. With the increase of the processing units, tasks to be processed also increase rapidly. How to process the tasks efficiently and quickly becomes a key criterion for measuring SOC performance.

In the prior art, when processing tasks, the SOC aggregates a current state of each processing unit to one or more separate schedulers, and then, according to the current state of each processing unit, the schedulers schedule corresponding processing units to process the tasks.

In the prior art, when processing tasks, one or more separate schedulers are required to schedule each processing unit to process tasks according to the state of each processing unit, that is, the tasks are processed in a centralized scheduling manner. Consequently, information required for the scheduling is hardly exchanged in real time, each processing unit cannot be scheduled in real time to process the tasks, and each processing unit is unable to respond to the scheduling of the schedulers in real time, which leads to a long scheduling response cycle and a low task processing efficiency.

SUMMARY

To solve problems in the prior art, embodiments of the present invention provide a task processing apparatus and a method. The technical solutions are as follows:

In a first aspect, a task processing apparatus is provided, where the task processing apparatus includes:

a task input unit, configured to obtain one or more configured tasks;

a scheduling unit, configured to select a task to be scheduled from the one or more tasks;

a processing unit, configured to process the task to be scheduled according to control parameters of the task to be scheduled selected by the scheduling unit, so as to obtain a processing result; and a data output unit, configured to output the processing result obtained after the processing unit processes the task to be scheduled; where the scheduling unit is further configured to: according to the control parameters of the task to be scheduled, schedule a next-level task processing apparatus to continue to process the task to be scheduled, where the next-level task processing apparatus is the same as the task processing apparatus, or is a task processing apparatus other than the task processing apparatus.

In a first possible implementation mode of the first aspect, the task processing apparatus further includes:

a power supply management unit, configured to trigger a signal of starting a clock according to changes of an external interface signal when the task processing apparatus is in an idle state, and turn on a power supply within a preset time to cause the task processing apparatus to enter a working state, where the power supply management unit is further configured to perform a low power consumption management for the task processing apparatus according to a type of the task processing apparatus when the task processing apparatus enters the idle state.

With reference to the first aspect or the first possible implementation mode of the first aspect, in a second possible implementation mode, the task input unit is further configured to obtain portal information of the one or more tasks, where the portal information includes at least an address of the control parameters of each task;

the task processing apparatus further includes:

a task parsing unit, configured to obtain the control parameters of the task to be scheduled according to the address of the control parameters in the portal information of the task to be scheduled, where the control parameters include a data input address and a data output address; and a data input unit, configured to input data of the task to be scheduled according to the data input address in the control parameters obtained by the task parsing unit;

the processing unit is specifically configured to process the task to be scheduled to obtain a processing result according to the data input by the data input unit; and the data output unit is specifically configured to output the processing result according to the data output address in the control parameters obtained by the task parsing unit, where the processing result is obtained after the processing unit after processes the task to be scheduled.

With reference to the second possible implementation mode of the first aspect, in a third possible implementation mode, further, the control parameters of the task to be scheduled, which are obtained by the task parsing unit, further include a portal address of the next-level task processing apparatus; and the scheduling unit is specifically configured to: according to the portal address of the next-level task processing apparatus in the control parameters obtained by the task parsing unit, schedule the next-level task processing apparatus to process the task to be scheduled.

With reference to the third possible implementation mode of the first aspect, in a fourth possible implementation mode, the task processing apparatus further includes:

a message output unit, configured to send a task start control message to the next-level task processing apparatus to schedule the next-level task processing apparatus to process the task to be scheduled; or an interrupt output unit, configured to send an interrupt notification to the next-level task processing apparatus to schedule the next-level task processing apparatus to interrupt the processing of the task to be scheduled.

With reference to the fourth possible implementation mode of the first aspect, in a fifth possible implementation mode, the task processing apparatus further includes:

a consistency management unit, configured to maintain an order between the output of the processing result by the data output unit, the output of the task start control message by the message output unit, and the output of the interrupt notification by the interrupt output unit.

With reference to the first aspect or the first possible implementation mode or the second possible implementation mode or the third possible implementation mode or the fourth possible implementation mode or the fifth possible implementation mode of the first aspect, in a sixth possible implementation mode, the task processing apparatus further includes:

an interrupt input unit, configured to input an interrupt notification sent by a previous-level task processing apparatus, where the previous-level task processing apparatus is the same as the task processing apparatus or is a task processing apparatus other than the task processing apparatus; where the processing unit is further configured to interrupt the processing of the task to be scheduled according to the interrupt notification input by the interrupt input unit.

In a second aspect, a task processing method is provided, where the method includes:

obtaining, by a task processing apparatus, one or more configured tasks, and selecting a task to be scheduled from the one or more tasks; and processing the task to be scheduled according to control parameters of the task to be scheduled to obtain a processing result, outputting the processing result of the task to be scheduled, and, according to the control parameters of the task to be scheduled, scheduling a next-level task processing apparatus to continue to process the task to be scheduled, where the next-level task processing apparatus is the same as the task processing apparatus, or is a task processing apparatus other than the task processing apparatus.

With reference to the second aspect, in a first possible implementation mode, before the obtaining, by a task processing apparatus, one or more configured tasks, the method further includes:

triggering a signal of starting a clock according to changes of an external interface signal when the task processing apparatus is in an idle state, and turning on a power supply within a preset time to cause the task processing apparatus to enter a working state; and after the processing the task to be scheduled according to control parameters of the task to be scheduled to obtain a processing result, the method further includes:

performing a low power consumption management for the task processing apparatus according to the type of the task processing apparatus if the task processing apparatus enters the idle state.

With reference to the second aspect or the first possible implementation mode of the second aspect, in a second possible implementation mode, the portal information of the one or more tasks includes at least an address of the control parameters of each task;

before the processing the task to be scheduled according to control parameters of the task to be scheduled to obtain a processing result, the method further includes:

obtaining the control parameters of the task to be scheduled according to the address of the control parameters in the portal information of the task to be scheduled, where the control parameters include a data input address and a data output address;

inputting data of the task to be scheduled according to the data input address in the control parameters; and the processing the task to be scheduled according to control parameters of the task to be scheduled to obtain a processing result, and the outputting the processing result of the task to be scheduled, specifically include:

processing the task to be scheduled according to input data of the task to be scheduled to obtain the processing result, and outputting the processing result of the task to be scheduled according to the data output address in the control parameters.

With reference to the second possible implementation mode of the second aspect, in a third possible implementation mode, the control parameters of the task to be scheduled further include a portal address of the next-level task processing apparatus; and the scheduling the next-level task processing apparatus to process the task to be scheduled specifically includes:

according to the portal address of the next-level task processing apparatus in the control parameters, scheduling the next-level task processing apparatus to process the task to be scheduled.

With reference to the third possible implementation mode of the second aspect, in a fourth possible implementation mode, after the scheduling the next-level task processing apparatus according to the portal address of the next-level task processing apparatus in the control parameters to process the task to be scheduled, the method further includes:

sending a task start control message to the next-level task processing apparatus to schedule the next-level task processing apparatus to process the task to be scheduled; or sending an interrupt notification to the next-level task processing apparatus to schedule the next-level task processing apparatus to interrupt the processing of the task to be scheduled.

With reference to the fourth possible implementation mode of the second aspect, in a fifth possible implementation mode, the method further includes:

maintaining an order between the output of the processing result, the output of the task start control message, and the interrupt notification.

With reference to the first aspect, or the first possible implementation mode or the second possible implementation mode or the third possible implementation mode or the fourth possible implementation mode or the fifth possible implementation mode of the first aspect, in a sixth possible implementation mode, the method further includes:

inputting the interrupt notification sent by a previous-level task processing apparatus, and interrupting processing of the task to be scheduled according to the interrupt notification, where the previous-level task processing apparatus is the same as the task processing apparatus, or is a task processing apparatus other than the task processing apparatus.

The technical solutions provided in the embodiments of the present invention bring the following beneficial effects:

The task processing apparatus selects the task to be scheduled from one or more configured tasks, and then processes the task to be scheduled in real time according to control parameters of the task to be scheduled, so that each task processing apparatus can be scheduled to process tasks independently. In addition, with mutual scheduling between the task processing apparatuses, instead of using separate schedulers to perform centralized scheduling, distributed scheduling of task processing is implemented. Therefore, the scheduling speed is high, and the task processing efficiency is high.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

Embodiment 1

Figure 1:
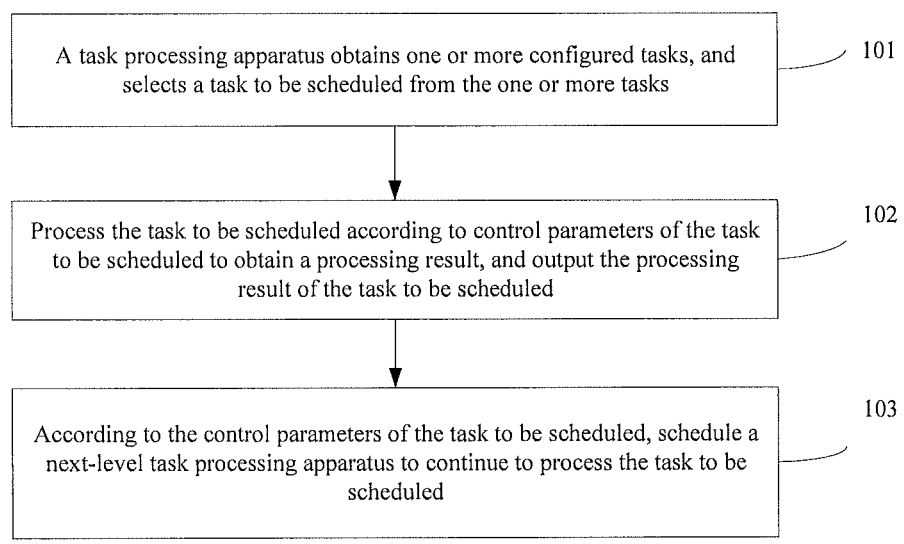
FIG. 1 is a flowchart of a task processing method according to Embodiment 1 of the present invention.

This embodiment of the present invention provides a task processing method. Referring to FIG. 1, the procedure of the method includes the following:

Step 101: A task processing apparatus obtains one or more configured tasks, and selects a task to be scheduled from the one or more tasks.

Step 102: Process the task to be scheduled according to control parameters of the task to be scheduled to obtain a processing result, and output the processing result of the task to be scheduled.

Further, before the task processing apparatus obtains one or more configured tasks, the method further includes:

if the task processing apparatus is in an idle state, triggering a signal of starting a clock according to changes of an external interface signal, and turning on a power supply within a preset time to cause the task processing apparatus to enter a working state; and after the processing the task to be scheduled according to control parameters of the task to be scheduled to obtain a processing result, the method further includes:

performing a low power consumption management for the task processing apparatus according to a type of the task processing apparatus if the task processing apparatus enters the idle state.

Further, portal information of the one or more tasks includes at least an address of the control parameters of each task;

before the processing the task to be scheduled according to control parameters of the task to be scheduled to obtain a processing result, the method further includes:

obtaining the control parameters of the task to be scheduled according to the address of the control parameters in the portal information of the task to be scheduled, where the control parameters include a data input address and a data output address; and inputting data of the task to be scheduled according to the data input address in the control parameters; and the processing the task to be scheduled according to control parameters of the task to be scheduled to obtain a processing result, and the outputting the processing result of the task to be scheduled, specifically include:

processing the task to be scheduled according to input data of the task to be scheduled to obtain the processing result, and outputting the processing result of the task to be scheduled according to the data output address in the control parameters.

Step 103: According to the control parameters of the task to be scheduled, schedule a next-level task processing apparatus to continue to process the task to be scheduled, where the next-level task processing apparatus is the same as the task processing apparatus, or is a task processing apparatus other than the task processing apparatus.

Further, the control parameters of the task to be scheduled further include a portal address of the next-level task processing apparatus; and the scheduling the next-level task processing apparatus to process the task to be scheduled specifically includes:

according to the portal address of the next-level task processing apparatus in the control parameters, scheduling the next-level task processing apparatus to process the task to be scheduled.

Further, after scheduling the next-level task processing apparatus according to the portal address of the next-level task processing apparatus in the control parameters to process the task to be scheduled, the method further includes:

sending a task start control message to the next-level task processing apparatus to schedule the next-level task processing apparatus to process the task to be scheduled; or sending an interrupt notification to the next-level task processing apparatus to schedule the next-level task processing apparatus to interrupt the processing of the task to be scheduled.

Further, the method includes:

maintaining an order between the output of the processing result, the output of the task start control message, and the interrupt notification.

Further, the method includes:

inputting the interrupt notification sent by a previous-level task processing apparatus, and interrupting processing of the task to be scheduled according to the interrupt notification, where the previous-level task processing apparatus is the same as the task processing apparatus, or is a task processing apparatus other than the task processing apparatus.

In the method provided in the embodiment of the present invention, the task processing apparatus selects the task to be scheduled from one or more configured tasks, and then processes the task to be scheduled in real time according to control parameters of the task to be scheduled, so that each task processing apparatus can process tasks independently. In addition, with mutual scheduling between the task processing apparatuses, instead of using separate schedulers to perform centralized scheduling, distributed scheduling of task processing is implemented. Therefore, the scheduling speed is high, and the task processing efficiency is high. In addition, power supply management is performed for the task processing apparatus according to the state and the type of the task processing apparatus, which reduces energy consumption of the task processing apparatus.

Embodiment 2

This embodiment of the present invention provides a task processing method. The method processes tasks in a manner of distributed scheduling, which improves the efficiency and speed of task processing. To facilitate detailed description of the method provided in the embodiment, the following uses an example to describe the method in the embodiment by assuming that a processing apparatus in a task processing system shown in FIG. 2 processes tasks. Referring to FIG. 3, the procedure of the method provided in this embodiment includes the following:

Step 301: A task processing apparatus obtains one or more configured tasks, where portal information of each task includes at least an address of control parameters of each task.

In this step, the one or more tasks may be configured by a previous-level task processing apparatus of the task processing apparatus, or configured by the task processing apparatus itself, or configured by a next-level task processing apparatus of the task processing apparatus. That is, the task processing apparatus may be scheduled by its previous-level task processing apparatus or scheduled by itself or scheduled by the next-level task processing apparatus. Which task processing apparatus configures the task that is acquired depends on specific conditions.

Each task carries its own portal information, and the portal information of each task includes at least an address of the control parameters of each task so that the control parameters can be read according to the address of the control parameters in the subsequent steps. The control parameters are used to control a task processing process. Nevertheless, in addition to the address of the control parameters, the portal information of each task may also include other information such as some descriptive information about the control parameters, and specific content of the portal information of each task is not specifically limited in this embodiment.

Figure 2:
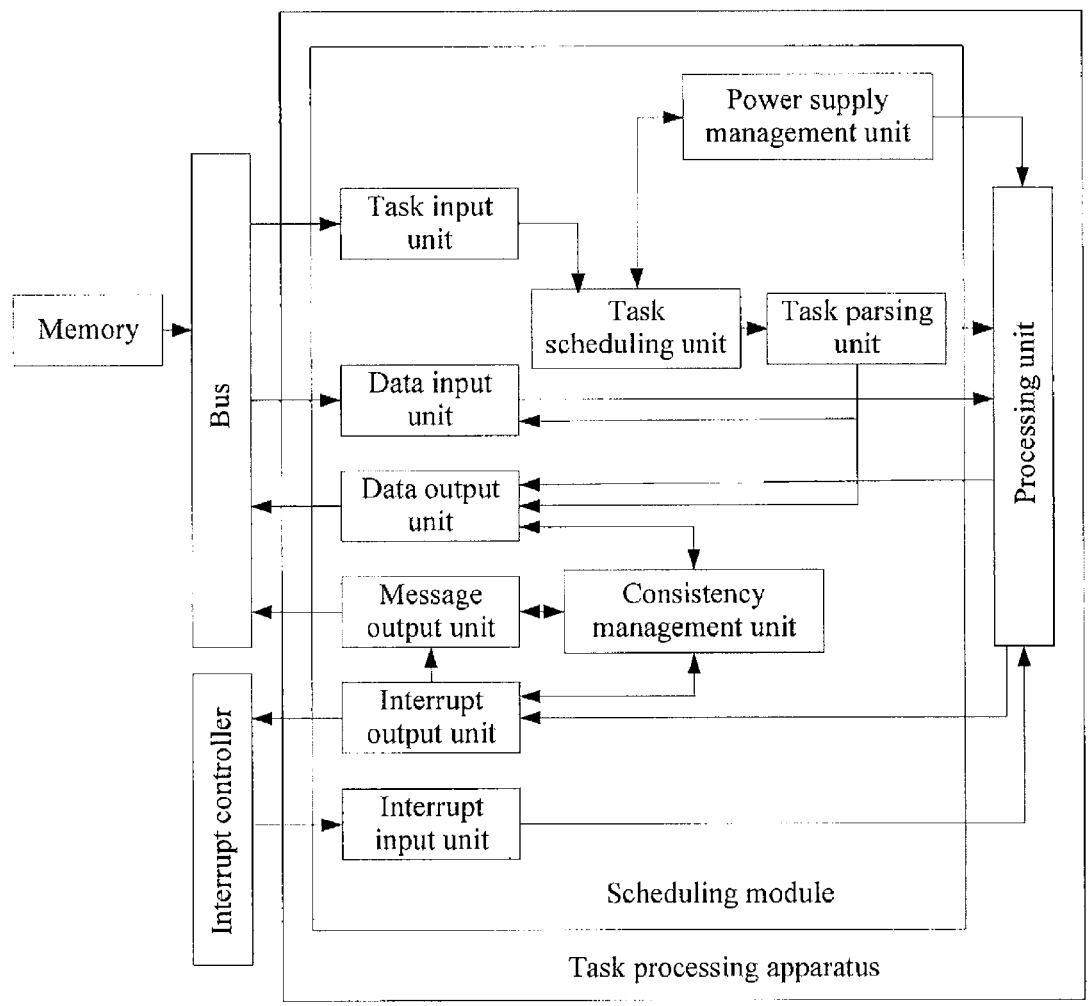
FIG. 2 is a schematic diagram of a task processing system according to Embodiment 2 of the present invention.
Figure 3:
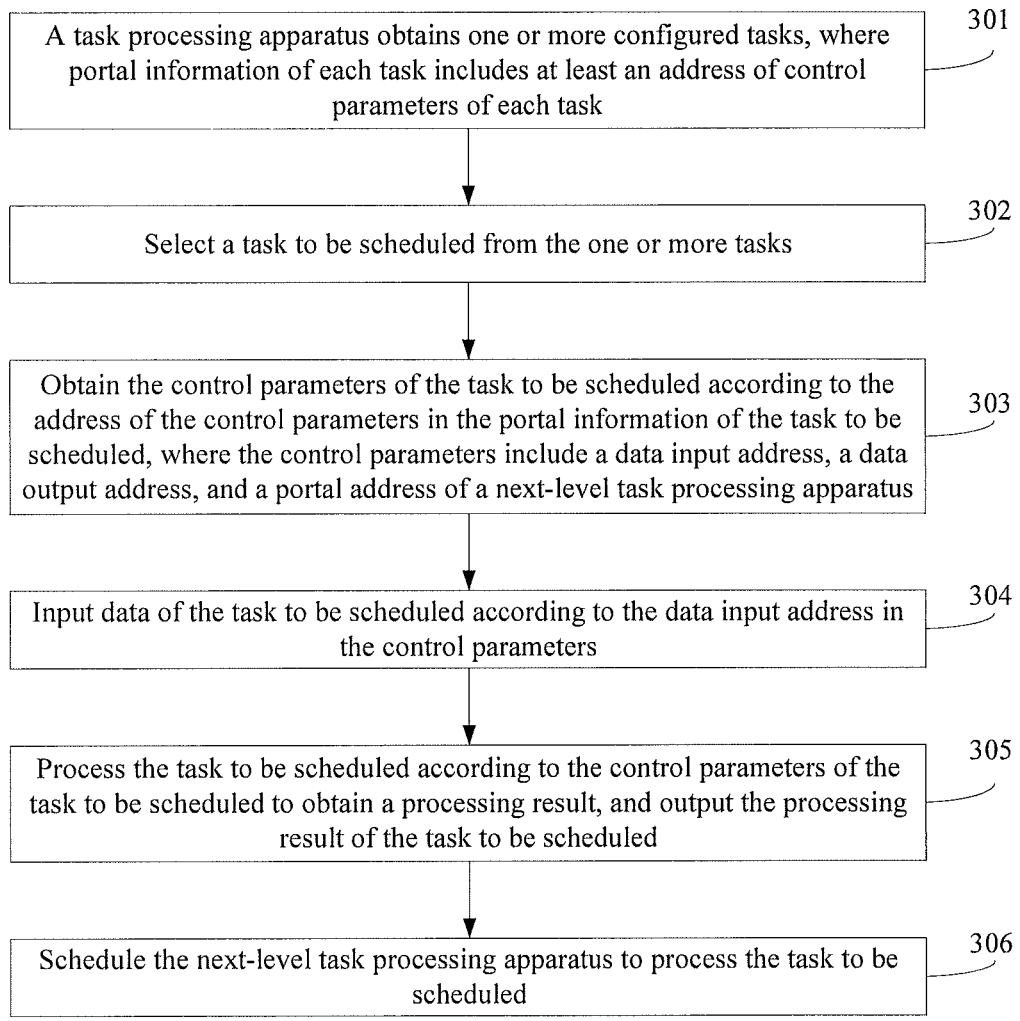
FIG. 3 is a flowchart of a task processing method according to Embodiment 2 of the present invention.

Further, after obtaining the portal information of the one or more tasks, the task processing apparatus may buffer the portal information of the one or more tasks into a storage medium of a task input module shown in FIG. 2, where the storage medium may be a read-only register or the like, and a specific storage medium is not limited in this embodiment.

Step 302: Select a task to be scheduled from the one or more tasks.

Specifically, the task to be scheduled may be selected from the one or more tasks in multiple manners, for example, selected at random or selected according to the number of times of scheduling the tasks. Furthermore, priority levels are set for multiple tasks before the task to be scheduled is selected, and then the multiple tasks are scheduled sequentially according to the priority levels. The priority levels may be set according to the scheduling frequency of each task. For example, if two tasks of the task processing apparatus are identified by A and B respectively, and, if the scheduling frequency of task A is higher than that of task B, the priority level of task A is set to be higher than that of task B. In addition, other setting manners may apply instead. For example, the priority levels are set according to complexity and a time limit of the task. A specific manner of setting the priority levels for the tasks or a manner of selecting the task to be scheduled is not specifically limited in this embodiment.

Step 303: Obtain the control parameters of the task to be scheduled according to the address of the control parameters in the portal information of the task to be scheduled, where the control parameters include a data input address, a data output address, and a portal address of a next-level task processing apparatus.

Specifically, after the task to be scheduled is selected according to step 302, the portal information of the task to be scheduled may be obtained in the portal information of the one or more tasks obtained by the task processing apparatus in step 301, then an address of the control parameters of the task to be scheduled is obtained in the portal information of the task to be scheduled, and then the control parameters of the task to be scheduled are obtained according to the address of the control parameters of the task to be scheduled. In addition to the data input address, the data output address, and the portal address of the next-level task processing apparatus, the control parameters may also include other information. This embodiment does not limit the information included in the control parameters.

Step 304: Input data of the task to be scheduled according to the data input address in the control parameters.

In this step, each task corresponds to its own data, and the data of each task is pre-stored in a corresponding storage space. The control parameters can control input of the data. For example, a memory shown in FIG. 2 stores data of all tasks to be processed by the task processing apparatus, and a mapping relationship between the data of each task and the task. After the control parameters of the task to be scheduled are obtained according to step 303, the data input address in the control parameters of the task to be scheduled is read, and the data of the task to be scheduled is obtained from the memory according to the mapping relationship between the task to be scheduled and the data of the task to be scheduled, and, according to the data input address in the control parameters of the task to be scheduled, the data of the task to be scheduled is input into the data input unit shown in FIG. 2.

Step 305: Process the task to be scheduled according to the control parameters of the task to be scheduled to obtain a processing result, and output the processing result of the task to be scheduled.

Specifically, after the data of the task to be scheduled is input into the data input unit shown in FIG. 2, the data may be sent to the processing unit for processing. After the processing unit completes the processing, a processing result of the task to be scheduled is output into the data output unit shown in FIG. 2. The processing unit may be an accelerator or a DSP (Digital Signal Processor, digital signal processor) or a CPU (Central Processing Unit, central processing unit). The data of the task to be scheduled may be processed in an existing manner, which is not specifically limited in this embodiment.

After the task is scheduled and processed inside the task processing apparatus according to the foregoing steps, on the prerequisite of ensuring the speed and efficiency of task processing, to reduce power consumption, after the task to be scheduled is processed according to the control parameters of the task to be scheduled and a processing result is obtained, the method provided in this embodiment may further include:

performing a low power consumption management for the task processing apparatus according to a type of the task processing apparatus if the task processing apparatus enters an idle state.

The performing the low power consumption management for the task processing apparatus according to the type of the task processing apparatus includes: turning on the corresponding power supply and clock, and getting the Memory (memory) into sleep, and so on. The specific management process includes but is not limited to:

if the task processing apparatus needs to store static control information, controlling other parts except the power supply management unit, the task input unit, and the interrupt input unit in FIG. 2 to get into a lower power consumption state; and if the task processing apparatus does not need to store static control information, turning off power supplies of other parts except the power supply management unit, the task input unit, and the interrupt input unit in FIG. 2.

If a response speed of the task processing apparatus is required to reach a preset threshold, the clocks of other parts except the power supply management unit shown in FIG. 2 are turned off, where the preset threshold depends on specific conditions, for example, 1 millisecond, 2 milliseconds, or another value. A value of the preset threshold is not specifically limited in this embodiment. In the method provided in this embodiment, the scheduling response speed of power supply management is high, at a precision of several clock cycles. The method is especially suitable for a radio communication physical layer to handle a scenario in which a short cycle alternates between the busy state and the idle state.

Further, no matter which of the foregoing manners is used to perform a power management operation on the task processing apparatus, if the task processing apparatus is in an idle state when a task needs to be processed, a signal of starting a clock may be triggered according to changes of an external interface signal of the task processing apparatus, and a power supply may be turned on within a preset time to cause the task processing apparatus to enter a working state.

Optionally, if an interrupt notification sent by a previous-level task processing apparatus is received when the task processing apparatus processes the task to be scheduled, the processing of the task to be scheduled is interrupted according to the interrupt notification.

Optionally, if no further processing is required after the task processing apparatus completes the processing of the task to be scheduled, then after a processing result is output, the message output unit shown in FIG. 2 sends a task start control message to a next-level task processing apparatus to schedule the next-level task processing apparatus to process the task to be scheduled; or the interrupt output unit shown in FIG. 2 sends an interrupt notification to the next-level task processing apparatus to schedule the next-level task processing apparatus to interrupt the processing of the task to be scheduled. If the task to be scheduled needs to be further processed by the task processing apparatus after the task processing apparatus completes the processing of the task to be scheduled, the following step 306 is executed.

It should be noted that, if the task processing apparatus requires that the interrupt output unit output an interrupt notification, the message output unit output a task start control message of the next-level task processing apparatus, and the data output unit output a processing result of the task to be scheduled simultaneously, then the consistency management unit may maintain an order between the output of the processing result by the data output unit, the output of the task start control message by the message output unit, and the output of the interrupt notification by the interrupt output unit, and manage the order between the three events in the system, where the three events are output of the processing result, output of the task start control message, and output of the interrupt notification, which ensures the system event order between the units and ensures the processing order between the units in the distributed scheduling. For example, if the three parts are output simultaneously, the usual order is: the next-level task processing apparatus of the task processing apparatus can read the control message when receiving the interrupt, and can read the data output by the previous-level task processing apparatus when receiving the control message.

Step 306: Schedule the next-level task processing apparatus to process the task to be scheduled.

In this step, the manner of scheduling the next-level task processing apparatus to process the task to be scheduled specifically includes but is not limited to the following:

according to the portal address of the next-level task processing apparatus in the control parameters, scheduling the next-level task processing apparatus to process the task to be scheduled, where the next-level task processing apparatus is the same as the task processing apparatus, or is a task processing apparatus other than the task processing apparatus. That is, the task processing apparatus may schedule other task processing apparatuses or reschedule itself to implement iterative processing of the tasks. No matter which task processing apparatus is the next-level task processing apparatus scheduled by the task processing apparatus, the task processing procedure of the next-level task processing apparatus is the same as the task processing manner and principles of the task processing apparatus, and details are not described herein.

Figure 4:
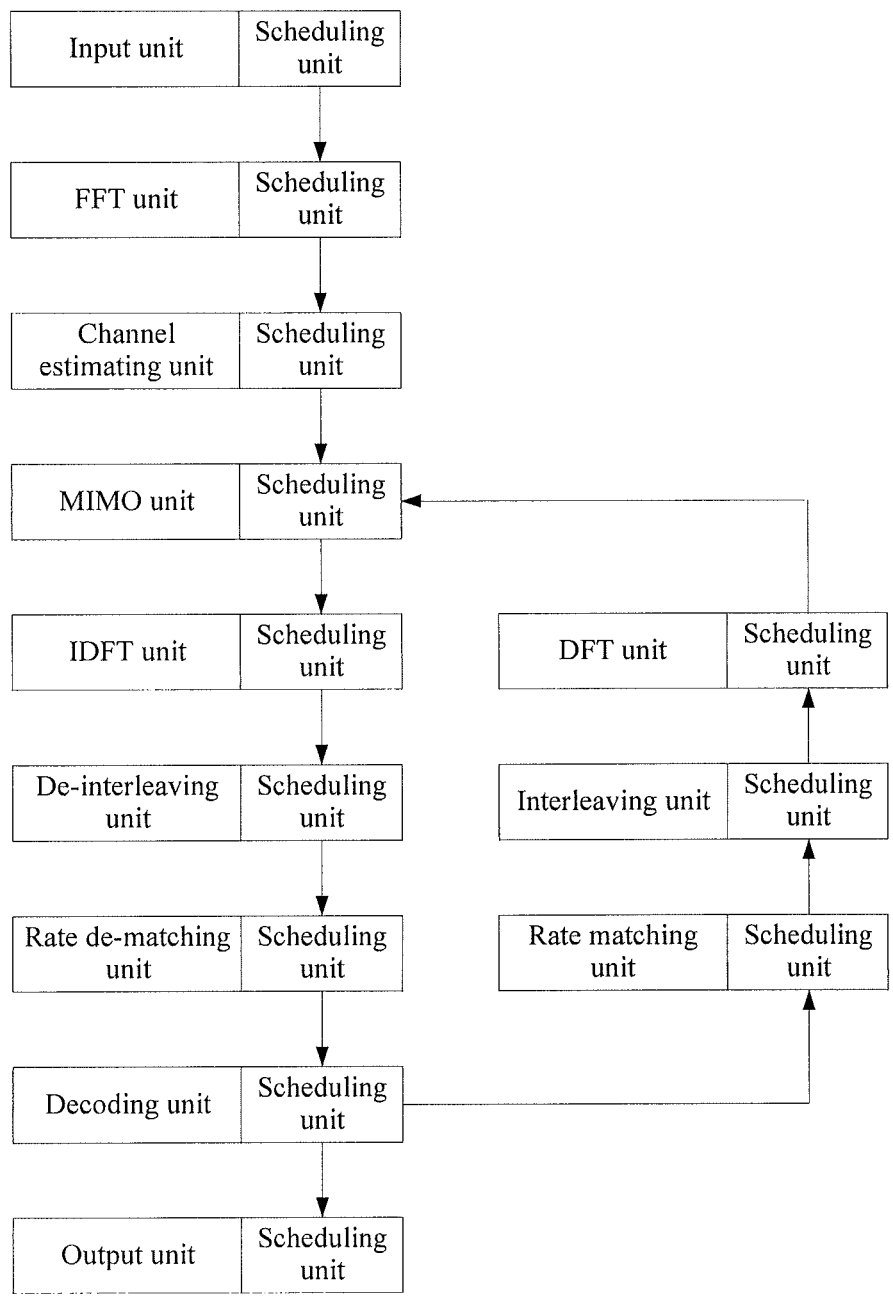
FIG. 4 is a schematic diagram of a task processing procedure according to Embodiment 2 of the present invention.

Specifically, to describe the method in this embodiment in detail, refer to FIG. 4. This embodiment uses dual-mode physical layer uplink processing as an example, where the dual modes include radio LTE (Long Term Evolution, Long Term Evolution) and UMTS (Universal Mobile Telecommunications System, Universal Mobile Telecommunications System).

It is assumed that completion of a task requires FFT processing performed by an FFT (Fast Fourier Transform, fast Fourier transformation) unit, channel estimation performed by a channel estimating unit, MIMO processing performed by a MIMO (Multiple Input Multiple Output, Multiple Input Multiple Output) unit, IDFT processing performed by an IDFT (Inverse Discrete Fourier Transform, inverse discrete Fourier transform) unit, de-interleaving performed by a de-interleaving unit, rate de-matching performed by a rate de-matching unit, and decoding performed by a decoding unit. Then, after the FFT unit performs fast Fourier transformation for the task to be scheduled, the channel estimating unit is scheduled according to the portal address of the channel estimating unit in the control parameters of the task to further process the task. If the channel estimating unit is in the working state at this time, the task to be scheduled is buffered into a task queue; and, if the channel estimating unit is in an idle state (such as a low power consumption state), the channel estimating unit recovers to a normal state and processes the task to be scheduled. When the task to be scheduled is processed, portal information of the task is directly received from the FFT unit, and the control parameters are obtained according to the address of the control parameters in the portal information of the task. The data of the task is input according to the data input address in the control parameters, and the task is processed according to the input data. Finally, the processing result of the task is output according to the data output address in the control parameters, and at the same time, the MIMO unit is scheduled according to the portal address of the MIMO unit in the control parameters of the task to further process the task. Similarly, after receiving the task portal information sent by a previous-level processing unit subsequently, each processing unit performs further processing for the task in the same way as the previous-level processing unit. After completing the task processing, the decoding unit may schedule a rate matching unit to perform rate matching, and then the rate matching unit schedules an interleaving unit to perform interleaving, and finally, the interleaving unit schedules a DFT unit to perform DFT processing, and the DFT unit schedules the previous-level MIMO unit to process the task again. The number of times of scheduling the previous-level MIMO unit depends on specific conditions, and is not limited in this embodiment.

Figure 5:
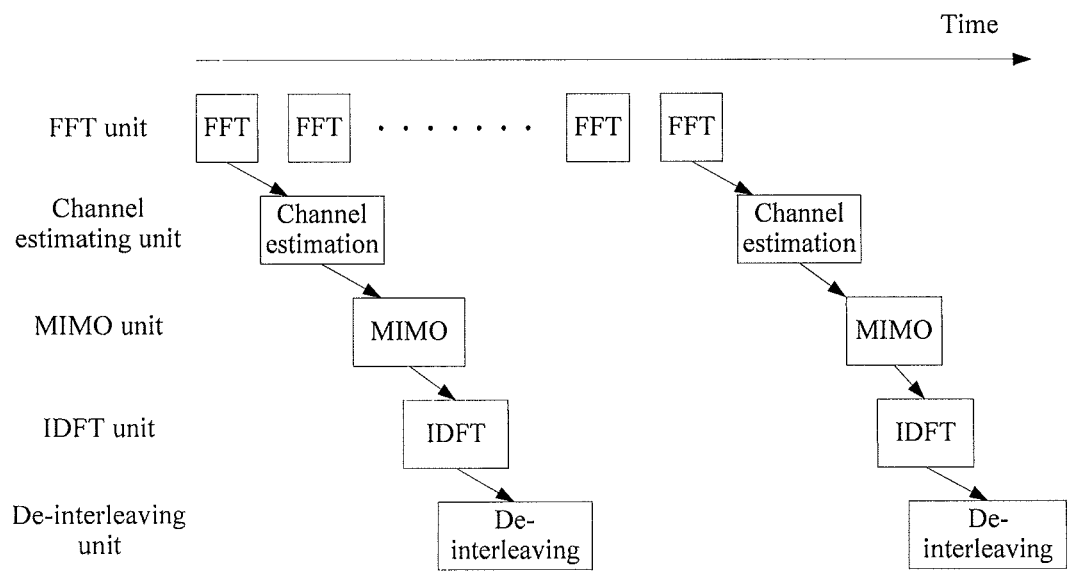
FIG. 5 is a schematic diagram of a time sequence of a task processing unit according to Embodiment 2 of the present invention.

It should be noted that each processing unit may be scheduled cyclically. A cycle value may be one millisecond or another value. A preset cycle value is not limited in this embodiment, and depends on specific conditions. When the task of a single carrier-sector is processed, the time sequence of scheduling some processing units may be shown in FIG. 5. The FFT unit is scheduled 12 to 14 times in a cycle, and, after the task to be scheduled is processed correspondingly, the channel estimating unit is scheduled. The channel estimating unit is scheduled twice in a cycle, and, each time after the channel estimating unit is scheduled and the task to be scheduled is processed correspondingly, the MIMO unit is scheduled 12 times. Each time after the MIMO unit is scheduled and the task to be scheduled is processed correspondingly, the IDFT unit is scheduled. When the tasks of multiple carrier-sectors are processed, the number of times of scheduling each processing unit in a preset cycle may depend on the number of carrier-sectors and the number of antennas of the carrier-sectors.

In the method provided in the embodiment of the present invention, the task processing apparatus selects the task to be scheduled from the one or more configured tasks, and then processes the task to be scheduled in real time according to the control parameters of the task to be scheduled, so that each task processing apparatus can process tasks independently. In addition, with mutual scheduling between the task processing apparatuses, instead of using separate schedulers to perform centralized scheduling, distributed scheduling of task processing is implemented. Therefore, the scheduling speed is high, and the task processing efficiency is high. In addition, power supply management is performed for the task processing apparatus according to the state and the type of the task processing apparatus, which reduces energy consumption of the task processing apparatus.

Embodiment 3

Figure 6:
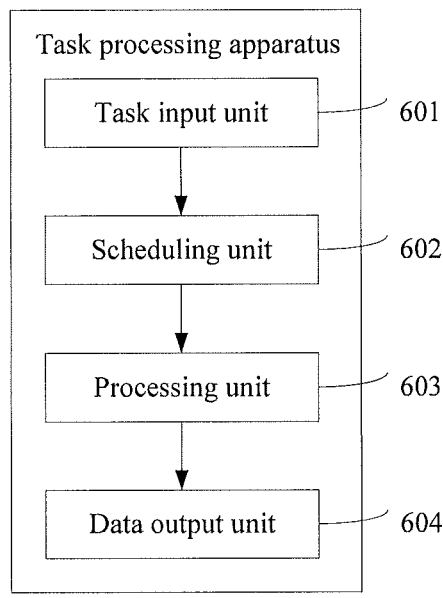
FIG. 6 is a schematic structural diagram of a task processing apparatus according to Embodiment 3 of the present invention.

This embodiment of the present invention provides a task processing apparatus to implement the task processing method provided in Embodiment 1 or Embodiment 2. Referring to FIG. 6, the task processing apparatus includes:

a task input unit 601, configured to obtain one or more configured tasks, where the task input unit 601 can buffer a certain number of tasks, and the number of the buffered tasks is not limited in this embodiment;

a scheduling unit 602, configured to select a task to be scheduled from the one or more tasks;

a processing unit 603, configured to process the task to be scheduled according to control parameters of the task to be scheduled selected by the scheduling unit 602, so as to obtain a processing result; and a data output unit 604, configured to output the processing result obtained by the processing unit 603 after processing the task to be scheduled; where the scheduling unit 602 is further configured to: according to the control parameters of the task to be scheduled, schedule a next-level task processing apparatus to continue to process the task to be scheduled, and the next-level task processing apparatus is the same as the task processing apparatus, or is a task processing apparatus other than the task processing apparatus.

Figure 7:
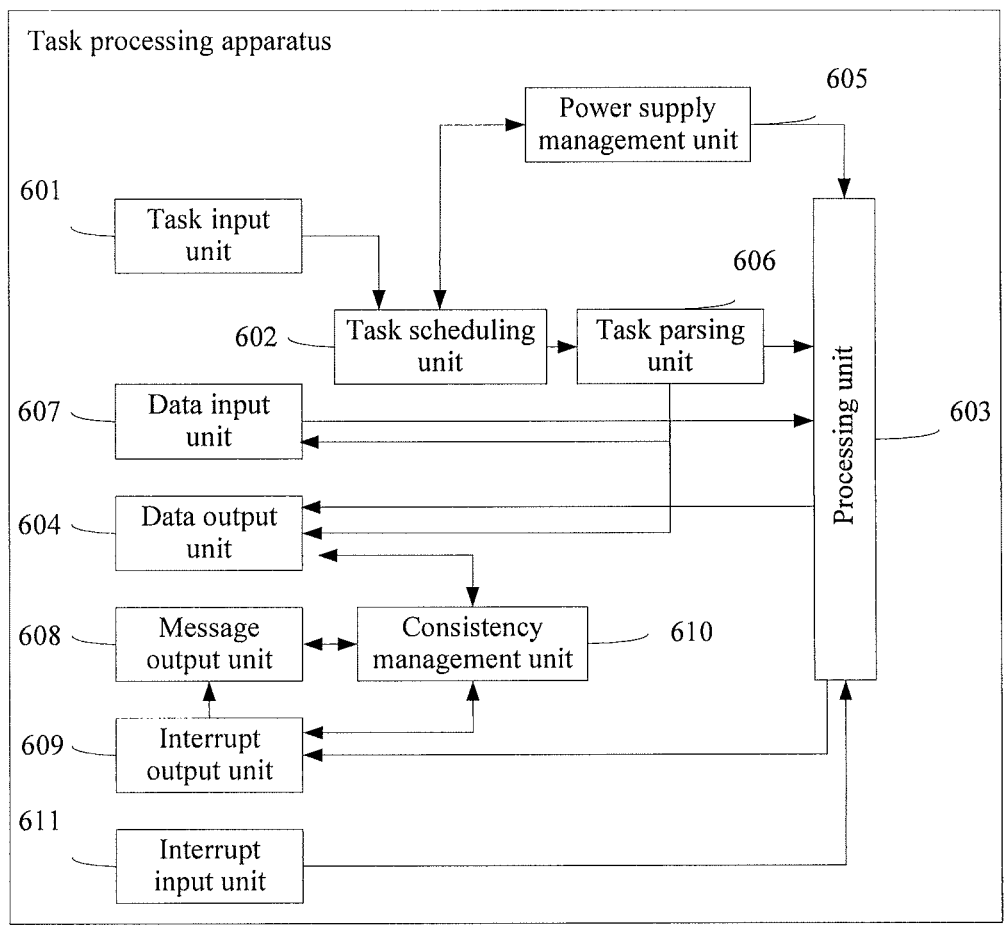
FIG. 7 is a schematic structural diagram of another task processing apparatus according to Embodiment 3 of the present invention.

Further, referring to FIG. 7, the task processing apparatus further includes:

a power supply management unit 605, configured to trigger a signal of starting a clock according to changes of an external interface signal when the task processing apparatus is in an idle state, and turn on a power supply within a preset time to cause the task processing apparatus to enter a working state, where the power supply management unit 605 is further configured to perform a low power consumption management for the task processing apparatus according to a type of the task processing apparatus when the task processing apparatus enters the idle state.

Further, the task input unit 601 is further configured to obtain portal information of one or more tasks, where the portal information includes at least an address of the control parameters of each task.

Further, referring to FIG. 7, the task processing apparatus further includes:

a task parsing unit 606, configured to obtain the control parameters of the task to be scheduled according to the address of the control parameters in the portal information of the task to be scheduled, where the control parameters include a data input address and a data output address; and a data input unit 607, configured to input data of the task to be scheduled according to the data input address in the control parameters obtained by the task parsing unit 606; where the processing unit 603 is specifically configured to process the task to be scheduled to obtain a processing result according to the data input by the data input unit 607; and the data output unit 604 is specifically configured to output the processing result according to the data output address in the control parameters obtained by the task parsing unit 606, where the processing result is obtained after the processing unit 603 processes the task to be scheduled.

Further, the control parameters of the task to be scheduled, which are obtained by the task parsing unit 606, further include a portal address of the next-level task processing apparatus; and the scheduling unit 602 is specifically configured to: according to the portal address of the next-level task processing apparatus in the control parameters obtained by the task parsing unit 606, schedule the next-level task processing apparatus to process the task to be scheduled.

Further, referring to FIG. 7, the task processing apparatus further includes:

a message output unit 608, configured to send a task start control message to the next-level task processing apparatus to schedule the next-level task processing apparatus to process the task to be scheduled; or an interrupt output unit 609, configured to send an interrupt notification to the next-level task processing apparatus to schedule the next-level task processing apparatus to interrupt the processing of the task to be scheduled; where the message output unit 608 sends a task start control message to the next-level task processing apparatus to schedule the next-level task processing apparatus to process the task to be scheduled, so as to implement distributed scheduling.

Further, referring to FIG. 7, the task processing apparatus further includes:

a consistency management unit 610, configured to maintain an order between the output of the processing result by the data output unit 604, the output of the task start control message by the message output unit 608, and the output of the interrupt notification by the interrupt output unit 609.

Further, referring to FIG. 7, the task processing apparatus further includes:

an interrupt input unit 611, configured to input an interrupt notification sent by a previous-level task processing apparatus, where the previous-level task processing apparatus is the same as the task processing apparatus or is a task processing apparatus other than the task processing apparatus; where the processing unit 603 is further configured to interrupt the processing of the task to be scheduled according to the interrupt notification input by the interrupt input unit.

In conclusion, in the apparatus provided in the embodiment of the present invention, the task processing apparatus selects the task to be scheduled from the one or more configured tasks, and then processes the task to be scheduled in real time according to the control parameters of the task to be scheduled, so that each task processing apparatus can process tasks independently. In addition, with mutual scheduling between the task processing apparatuses, instead of using separate schedulers to perform centralized scheduling, distributed scheduling of task processing is implemented. Therefore, the scheduling speed is high, and the task processing efficiency is high. In addition, power supply management is performed for the task processing apparatus according to the state and the type of the task processing apparatus, which reduces energy consumption of the task processing apparatus.

It should be noted that when the task processing apparatus provided in the foregoing embodiment processes tasks, division of the foregoing function units is taken as an example for illustration. In practical application, the foregoing functions may be undertaken by different function units as required, that is, the internal structure of the apparatus is divided into different function units to implement all or part of the functions described above. In addition, the task processing apparatus and the task processing method provided in the foregoing embodiments are based on the same conception. For the detailed implementation process, see the method embodiment, and details are not described herein.

The sequence number of an embodiment of the present invention is for ease of description only, and does not represent priority of the embodiment.

Persons of ordinary skill in the art should understand that all or part of the steps of the embodiments may be implemented by hardware or by a program instructing relevant hardware. The program may be stored in a computer readable storage medium such as a read-only memory, a disk, an optical disc, or the like.

The foregoing descriptions are merely exemplary embodiments of the present invention, but are not intended to limit the present invention. Any modifications, equivalent substitutions, and improvements made within principles of the present invention shall fall within the protection scope of the present invention.

What is claimed is:

1. A task processing apparatus, comprising:
a task input unit, configured to obtain one or more configured tasks;
a scheduling unit, configured to select a task to be scheduled from the one or more tasks;
a processing unit, configured to process the task to be scheduled according to control parameters of the task to be scheduled selected by the scheduling unit, so as to obtain a processing result; and
a data output unit, configured to output the processing result obtained after the processing unit processes the task to be scheduled; wherein
the scheduling unit is further configured to: according to the control parameters of the task to be scheduled, schedule a next-level task processing apparatus to continue to process the task to be scheduled; and
the next-level task processing apparatus includes the same types of units as the task processing apparatus,
wherein: the task input unit is further configured to obtain portal information of the one or more tasks, wherein the portal information comprises at least an address of the control parameters of each task; and
the task processing apparatus further comprises:
a task parsing unit, configured to obtain the control parameters of the task to be scheduled according to the address of the control parameters in the portal information of the task to be scheduled, wherein the control parameters comprise a data input address and a data output address; and
a data input unit, configured to input data of the task to be scheduled according to the data input address in the control parameters obtained by the task parsing unit; wherein
the processing unit is specifically configured to process the task to be scheduled according to the data input by the data input unit to obtain a processing result; and
the data output unit is specifically configured to output the processing result according to the data output address in the control parameters obtained by the task parsing unit, wherein the processing result is obtained after the processing unit processes the task to be scheduled,
wherein: the control parameters of the task to be scheduled, which are obtained by the task parsing unit, further comprise a portal address of the next-level task processing apparatus; and
the scheduling unit is specifically configured to schedule the next-level task processing apparatus to process the task to be scheduled according to the portal address of the next-level task processing apparatus in the control parameters obtained by the task parsing unit, wherein the units of the task processing apparatus include hardware.

2. The task processing apparatus according to claim 1, wherein the task processing apparatus further comprises:
a power supply management unit, configured to trigger a signal of starting a clock according to changes of an external interface signal when the task processing apparatus is in an idle state, and turn on a power supply within a preset time to cause the task processing apparatus to enter a working state, wherein
the power supply management unit is further configured to perform a low power consumption management for the task processing apparatus according to a type of the task processing apparatus when the task processing apparatus enters the idle state.

3. The task processing apparatus according to claim 1, wherein the task processing apparatus further comprises:
a message output unit, configured to send a task start control message to the next-level task processing apparatus to schedule the next-level task processing apparatus to process the task to be scheduled; or
an interrupt output unit, configured to send an interrupt notification to the next-level task processing apparatus to schedule the next-level task processing apparatus to interrupt the processing of the task to be scheduled.

4. The task processing apparatus according to claim 3, wherein the task processing apparatus further comprises:
a consistency management unit, configured to maintain an order between the output of the processing result by the data output unit, the output of the task start control message by the message output unit, and the output of the interrupt notification by the interrupt output unit.

5. The task processing apparatus according to claim 1, further comprising:
an interrupt input unit, configured to input an interrupt notification sent by a previous-level task processing apparatus, wherein the previous-level task processing apparatus is the same as the task processing apparatus or is a task processing apparatus other than the task processing apparatus; wherein
the processing unit is further configured to interrupt the processing of the task to be scheduled according to the interrupt notification input by the interrupt input unit.

6. A task processing method, comprising:
obtaining, by a task processing apparatus, one or more configured tasks, and selecting a task to be scheduled from the one or more tasks; and
processing the task to be scheduled according to control parameters of the task to be scheduled to obtain a processing result, outputting the processing result of the task to be scheduled, and, according to the control parameters of the task to be scheduled, scheduling a next-level task processing apparatus to continue to process the task to be scheduled, wherein
the next-level task processing apparatus is the same type of processing apparatus as the task processing apparatus,
wherein: portal information of the one or more tasks comprises at least an address of the control parameters of each task;
before the processing the task to be scheduled according to control parameters of the task to be scheduled to obtain a processing result, the method further comprises:
obtaining the control parameters of the task to be scheduled according to the address of the control parameters in the portal information of the task to be scheduled, wherein the control parameters comprise a data input address and a data output address; and
inputting data of the task to be scheduled according to the data input address in the control parameters; and
the processing the task to be scheduled according to control parameters of the task to be scheduled to obtain a processing result, and the outputting the processing result of the task to be scheduled, specifically comprise:
processing the task to be scheduled according to input data of the task to be scheduled to obtain the processing result, and outputting the processing result of the task to be scheduled according to the data output address in the control parameters,
wherein: the control parameters of the task to be scheduled further comprise a portal address of the next-level task processing apparatus; and
the scheduling the next-level task processing apparatus to process the task to be scheduled specifically comprises:
scheduling the next-level task processing apparatus to process the task to be scheduled according to the portal address of the next-level task processing apparatus in the control parameters, wherein the task processing apparatus and the next-level processing apparatus include hardware.

7. The method according to claim 6, wherein: before the obtaining, by a task processing apparatus, one or more configured tasks, the method further comprises:
if the task processing apparatus is in an idle state, triggering a signal of starting a clock according to changes of an external interface signal, and turning on a power supply within a preset time to cause the task processing apparatus to enter a working state; and
after the processing the task to be scheduled according to control parameters of the task to be scheduled to obtain a processing result, the method further comprises:
if the task processing apparatus enters the idle state, performing a low power consumption management for the task processing apparatus according to a type of the task processing apparatus.

8. The method according to claim 6, wherein: after the scheduling the next-level task processing apparatus to process the task to be scheduled according to the portal address of the next-level task processing apparatus in the control parameters, the method further comprises:
sending a task start control message to the next-level task processing apparatus to schedule the next-level task processing apparatus to process the task to be scheduled; or
sending an interrupt notification to the next-level task processing apparatus to schedule the next-level task processing apparatus to interrupt the processing of the task to be scheduled.

9. The method according to claim 8, further comprising:
maintaining an order between the output of the processing result, the output of the task start control message, and the interrupt notification.

10. The method according to claim 6, further comprising:
inputting the interrupt notification sent by a previous-level task processing apparatus, and interrupting processing of the task to be scheduled according to the interrupt notification, wherein
the previous-level task processing apparatus is the same as the task processing apparatus, or is a task processing apparatus other than the task processing apparatus.

* * * * *